United States Patent
Han et al.

(10) Patent No.: US 7,241,326 B2
(45) Date of Patent: Jul. 10, 2007

(54) AIR PURIFIER AND AIR PURIFICATION METHOD

(75) Inventors: Jae Oh Han, Seoul (KR); Jin Baek Kim, Suwon-si (KR); Weon Seok Choi, Seoul (KR); Jai Kwon Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 370 days.

(21) Appl. No.: 11/050,805

(22) Filed: Feb. 7, 2005

(65) Prior Publication Data

US 2005/0268583 A1 Dec. 8, 2005

(30) Foreign Application Priority Data

Jun. 2, 2004 (KR) ..................... 10-2004-0040001

(51) Int. Cl.
*B01D 46/00* (2006.01)

(52) U.S. Cl. ............................. 55/418; 55/471; 55/472

(58) Field of Classification Search .................. 55/410, 55/411, 413, 418, 467, 471, 472, 482, 485, 55/486

See application file for complete search history.

(56) References Cited

U.S. PATENT DOCUMENTS

| 6,666,912 B1 * | 12/2003 | Yan ............................. 96/224 |
| 6,913,637 B2 * | 7/2005 | Kim ............................... 95/8 |
| 6,929,684 B2 * | 8/2005 | Chang et al. ................. 96/226 |

FOREIGN PATENT DOCUMENTS

| CN | 2227296 Y | 5/1996 |
| CN | 2319733 Y | 5/1999 |
| CN | 1451883 A | 10/2003 |
| KR | 20-1986-0000894 | 8/1987 |
| KR | 20-1999-0030462 | 7/2000 |
| KR | 464515 B * | 12/2002 |
| KR | 10-2002-0015054 | 9/2003 |

* cited by examiner

*Primary Examiner*—Duane Smith
*Assistant Examiner*—Sonji Turner
(74) *Attorney, Agent, or Firm*—Staas & Halsey LLP (57) ABSTRACT

An air purifier including: a filter which removes contaminants from air passing therethrough; a fan which generates a flow force to pass air through the filter; and a rotating body rotatably mounted in the air purifier and defining a flow path around the fan, a discharge direction of the flow path being varied by rotation of the rotating body.

20 Claims, 7 Drawing Sheets

AIR PURIFIER AND AIR PURIFICATION METHOD

CROSS-REFERENCE TO RELATED APPLICATION

This application claims the benefit of Korean Patent Application No. 2004-40001, filed on Jun. 2, 2004 in the Korean Intellectual Property Office, the disclosure of which is incorporated herein by reference.

BACKGROUND OF THE INVENTION

1. Field of the Invention

The present invention relates to an air purifier, and more particularly, to a freestanding air purifier in which a discharge direction of purified air can be varied.

2. Description of the Related Art

Generally, a freestanding air purifier defines a flow path around an axial flow fan vertically mounted therein for intaking and discharging ambient air, and has a filter provided at an intake port for filtrating contaminants present in ambient air. This type of air purifier is referred to as a freestanding air purifier since its body has a vertically extended shape.

In such a freestanding air purifier, a discharge port is formed at the opposite side of the intake port such that intake air at the intake port is purified by the filter and discharged to the opposite side thereof, and is formed with an auto-blade allowing a variation of a specified angle so as to vary a discharge angle of the purified air.

In the freestanding air purifier, an air-stream flows from the rear side of the air purifier provided with the intake port to the front side thereof provided with the discharge port. Here, although, in the case where the discharge angle of air is varied by means of the auto-blade, the variation of the air-stream is slight. As a result, the variation of the air-stream is considerably restricted, so that the overall air-stream is not significantly changed.

Accordingly, when indoor air is purified by the conventional air purifier as described above, there is a problem in that as the purified air is distributed mainly from the font side of the air purifier, the purified air is non-uniformly distributed depending on where the air purifier is positioned in an installation area, thereby making the degree of air pollution non-uniform in the installation area.

Furthermore, there is a problem in that, since the discharge of the purified air is concentrated in one direction, it takes a long time to purify the entire installation area, thereby lowering purification efficiency.

BRIEF SUMMARY

The present invention has been made in view of these and/or other problems involved with the above-mentioned conventional air purifier, and one aspect of the present invention is to provide an air purifier, which can allow a free variation in a discharge direction of purified air, thereby making degree of air pollution of an installation area uniform.

It is another aspect of the present invention to provide an air purifier, which can reduce time for purifying the installation area, thereby enhancing purification efficiency.

According to an aspect of the present invention there is provided an air purifier, including: a filter which removes contaminants from air flowing therethough; a fan which generates a flow force to pass through the filter; and a rotating body rotatably mounted in the air purifier and defining a flow path around the fan, a discharge direction of the flow path being varied b rotation of the rotating body.

The air purifier may include a driving motor which rotates the rotating body.

The rotating body may include a rear guide and a stabilizer therein, and the flow path may include an intake flow path through the filter, and a discharge flow path defined by the rear guide and the stabilizer.

The air purifier may further include a gear assembly which transfers a driving force of the driving motor to the rotating body.

The rotating body may include multiple rotating bodies so as to have two or more discharge directions.

The multiple rotating bodies may comprise first and second rotating bodies provided such that the first and second rotating bodies are located at upper and lower stages in the air purifier, respectively.

The first and second rotating bodies may be driven such that the first and second rotating bodies have an independent rotating direction, respectively.

The air purifier may include first and second driving motors in the body of the air purifier which respectively rotate the first and second rotating bodies.

The first and second rotating bodies may be driven such that the first rotating body rotates in relation to the second rotating body.

The air purifier may include a driving motor, the first rotating body may be directly mounted on the second rotating body, and the second rotating body may be rotated by the driving motor and thus drives the first rotating body.

An air purifier including: a rotating body defining an airflow path having an air intake section and an air exhaust section, the rotating body having a discharge direction extending from the air exhaust section; a filter assembly which removes contaminants in air passing therethrough and is disposed at the air intake section; a fan which generates an air flow to draw air into the airflow path through the intake section and around the fan. The discharge direction is variable by rotation of the rotating body.

An air purifier including: a body having a first and a second rotating bodies each having an airflow path between an air intake section and an air exhaust section thereof, each rotating body having a discharge direction extending from the air exhaust section and each rotating body being independently rotatable with respect to the other rotating body; a filter assembly which removes contaminants in air passing therethrough and is disposed at the air intake section of each rotating body; and a fan which generates an air flow to draw air into the airflow path through the intake sections and around the fan. The discharge direction of each rotating body is variable by rotation of the rotating body.

An air purifier including: a body having a first and a second rotating bodies each having an airflow path between an air intake section and an air exhaust section, each rotating body having a discharge direction extending from the air exhaust section thereof, the first rotating body being rotatable in relation to the second rotating body; a filter assembly which removes contaminants in air passing therethrough and is disposed at the air intake section of each rotating body; and a fan which generates an air flow to draw air into the airflow path through the intake sections and around the fan. The discharge direction of each rotating body is variable by rotation of the rotating body.

A method of purifying air, including: providing a rotating body which defines a flow path to intake air in an intake direction and to discharge air in a discharge direction;

generating an air flow to intake air into the flow path and to discharge air from the flow path; and varying at least one of an intake direction and a discharge direction by rotating the rotating body.

Additional and/or other aspects and advantages of the present invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 1:
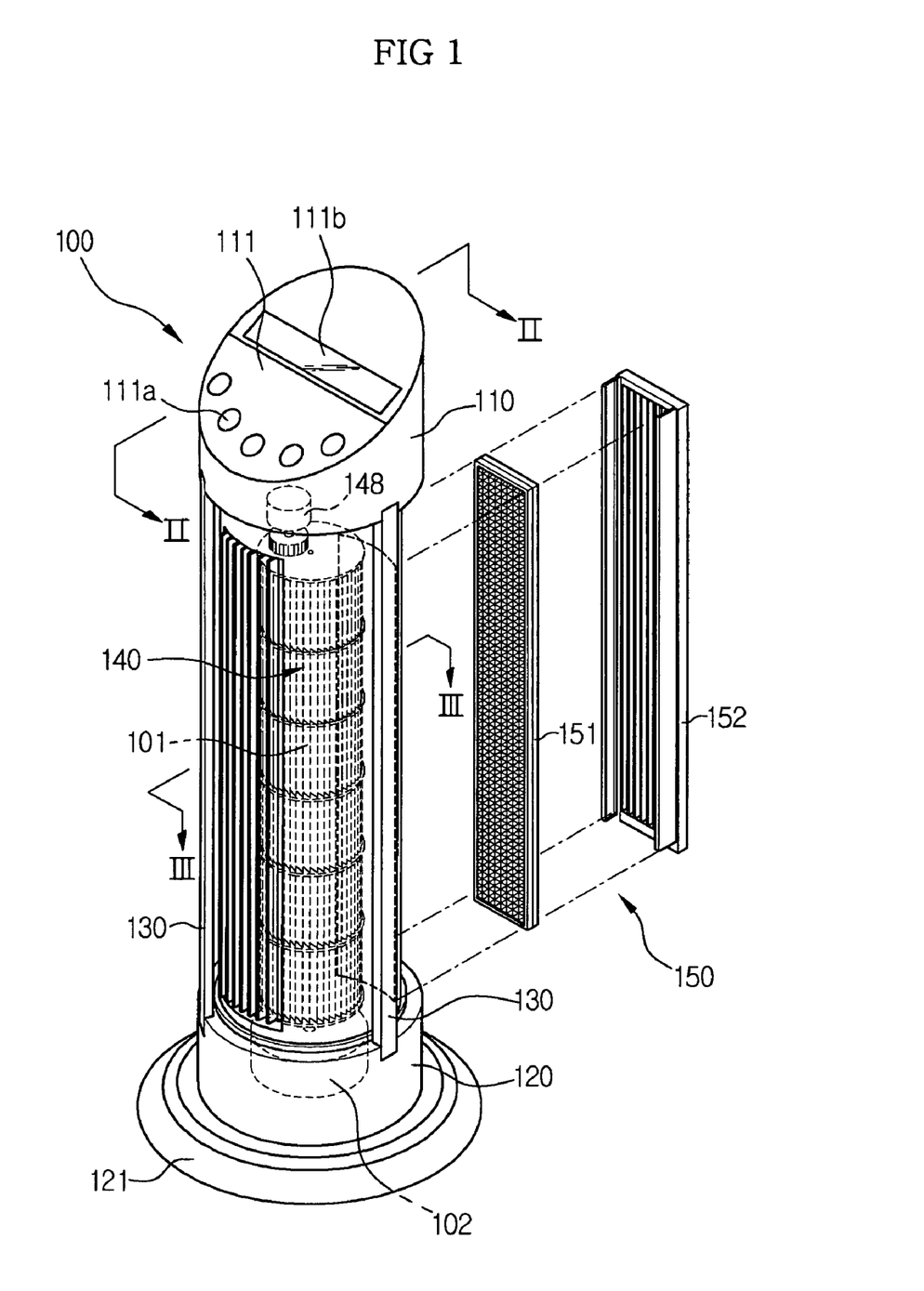
FIG. 1 is a perspective view illustrating an air purifier according to a first embodiment of the present invention.
Figure 2:
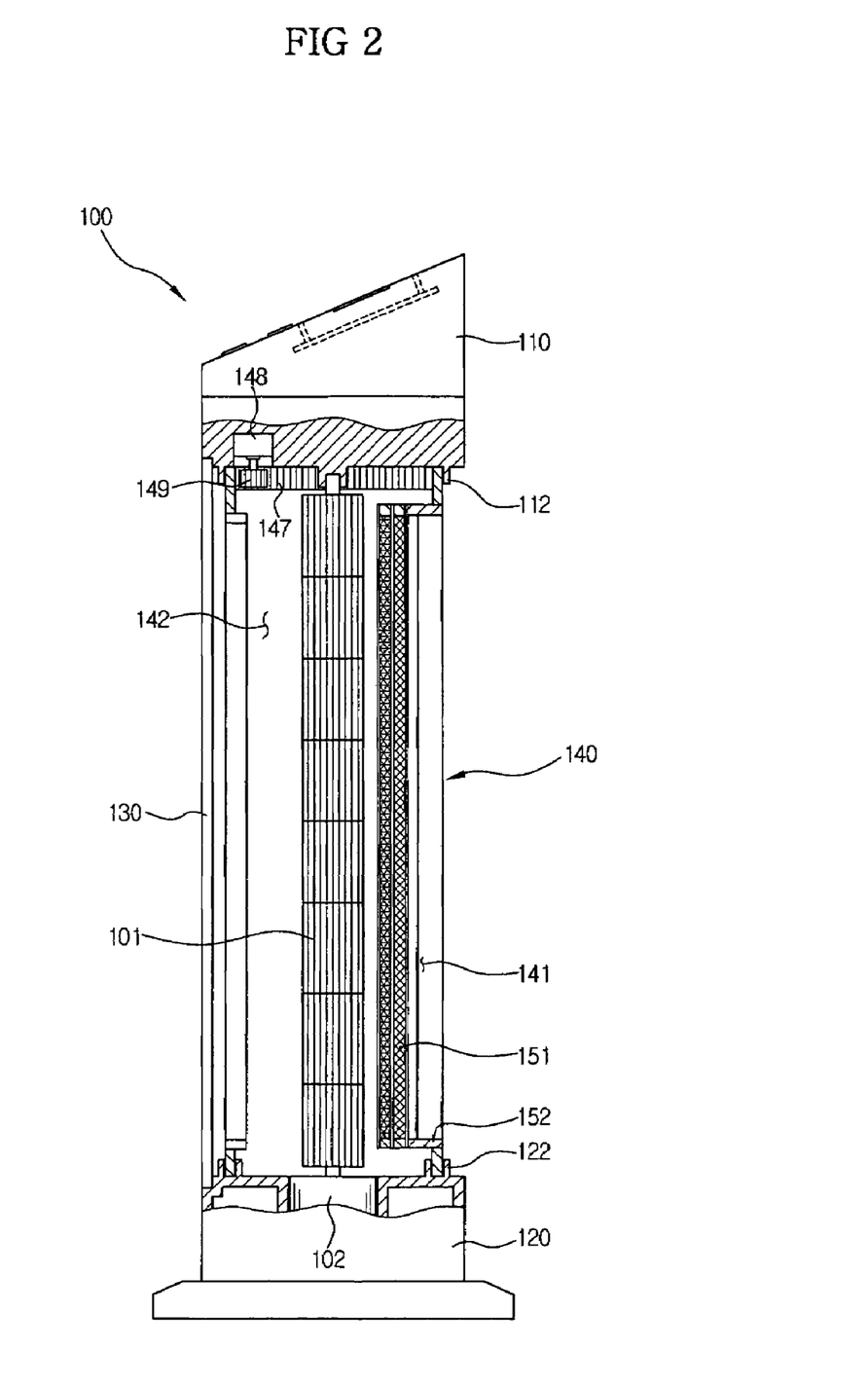
FIG. 2 is a cross-sectional view taken along line II-II of FIG. 1.
Figure 3:
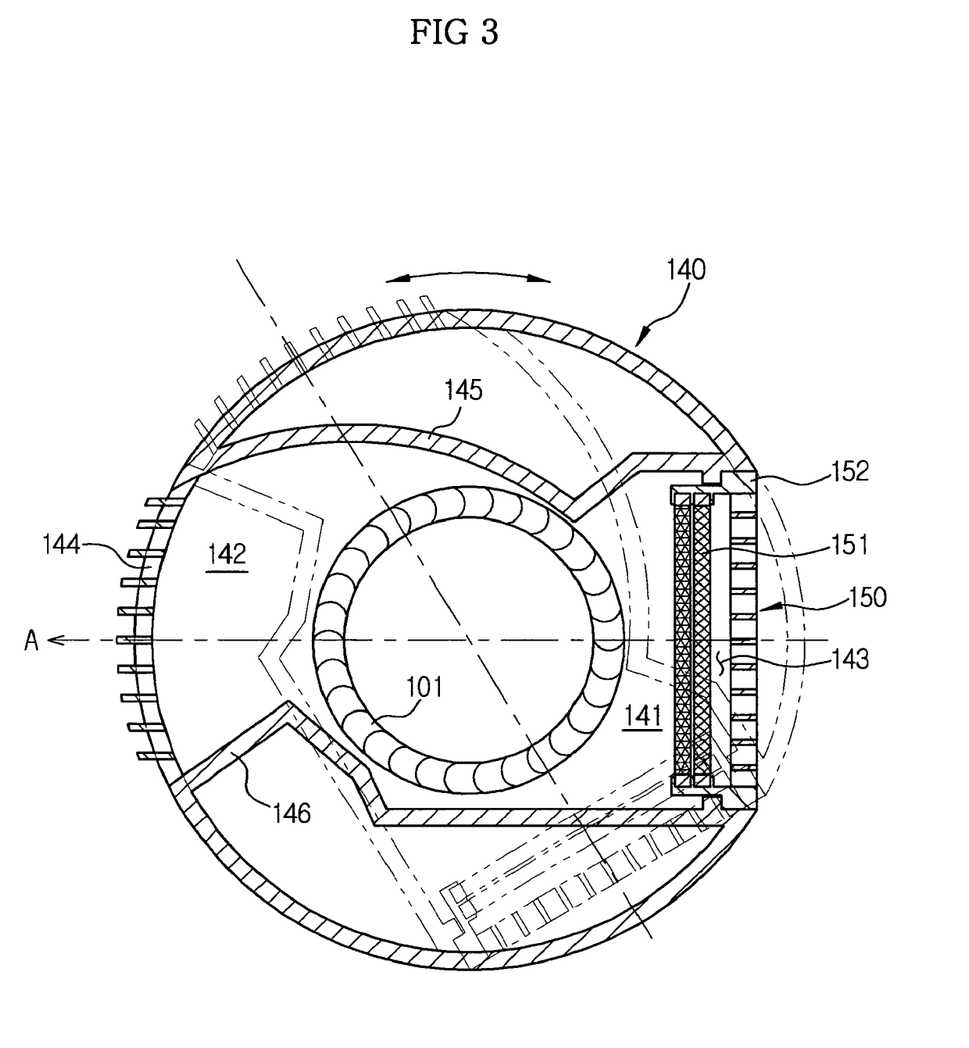
FIG. 3 is a cross-sectional view taken along line III-III of FIG. 1.

FIGS. 1 to 3 show an air purifier according to a first embodiment of the present invention. Referrin to FIGS. 1-3, the air purifier according to the first embodiment of the present invention includes a cylindrical body 100 standing upright, and a rotating body 140 rotatably mounted in the body 100.

The body 100 comprises an upper body 110 provided with an operation part 111 for controlling the air purifier, a lower body 120 provided with a fulcrum 121 for supporting the body 100 so that it does not fall down, and a support 130 for connecting the upper and lower bodies 110 and 120 to each other. The operation part 111 is provided with an operation button 111a for inputting a signal for operating the air purifier, and a display 111b for displaying an operating state of the air purifier. The body 100 is provided at a specified position therein with a controller for controlling operation of each component according to an input from the operation part 111.

An axial flow fan 101 is provided between the upper and lower bodies 110 and 120, respectively, parallel to the central axis of the upper and lower bodies 110 and 120. The top end of the axial flow fan 101 is slidably provided at a lower surface of the upper body 110, and the lower end of the axial flow fan 101 is connected to a driving axis of a fan motor 102 for driving the axial flow fan 101.

Referring to FIG. 3, the rotating body 140 is provided around the axial flow fan 101 such that an intake flow path 141 and a discharge flow path 142 for air are defined around the center of the axial air fan 101. As an entrance of the intake flow path 141, there is provided an intake port 143, which has a filter assembly 150 for removing dust, fumes, order and other contaminants suspended in the air.

The filter assembly 150 includes a filter 151, and a filter case 152 for fixing the filter 151. As for the filter 151, a typical filter for an air purifier, in which an antibacterial pre-filter for filtrating relatively large dust particles, a dust collection filter for removing fine particles, and the like are collectively coupled to each other, is used. The filter 151 is mounted on the intake flow path 141 with an edge of the filter 151 fixed to the filter case 152. The filter case 152 is provided with an intake grill such that air can be inhaled therethrough. It is preferable that the filter case 151 be detachably coupled to the intake flow path 141 for making it easy to replace or clean the filter 151.

At the opposite side of the intake flow path 141, the discharge flow path 142 is defined by a rear guide 145 and a stabilizer 146, and at the rear end of the discharge flow path 142, a discharge port 144 having a discharge grill is provided.

Approximate intake and discharge directions of air, defined by the structure of the flow path as described above, are indicated by an arrow A in FIG. 3. Such a flow path can be varied by rotation of the rotating body 140. The structure for varying the flow path is illustrated in FIG. 2. Specifically, the upper body 110 is provided with a driving motor 148 for rotating the rotating body 140. A driving force of the driving motor 148 is transferred to the rotating body 140 by a gear transmission. For this purpose, the driving motor 148 has a driving shaft formed with a pinion 149, and the cylindrical rotating body 140 has a internal gear 147 engaging with the pinion 149 at the upper end in the rotating body 140. The driving motor 148 employs a stepping motor, which can rotate in both clockwise and counter-clockwise directions, and is controlled by the controller. As the rotating body 140 rotates by the driving force of the driving motor 148, the discharge direction of air can be freely varied, and the discharge direction of air is controlled such that air can be discharged in all directions from the body 100. The upper and lower bodies 110 and 120 are provided with guide rails 112 and 122 at the bottom surface of the upper body 110 and at the top surface of the lower body 120, respectively, for allowing the rotating body 140 to easily rotate.

Operation of the air purifier according to the first embodiment is described below.

When starting the air purifier through the operation part 111, an airflow is generated with rotation of the axial flow fan 101. Air is inhaled through the intake grill, and filtrated through the filter 151, so that foreign substances in the air can be removed therefrom, providing purified air. The purified air is blown along the discharge flow path 142 by the axial flow fan 101.

Operation of the driving motor 148 to vary a blowing direction of air causes the entire rotating body 140 to rotate, changing the positions of the intake flow path 141 and the discharge flow path 142, so that the discharge direction of air is varied. According to control of the rotation by the driving motor 148, air can be discharged in all directions from the body 100, and the air contained in the installation area can be uniformly purified by continuously changing the discharge direction of the air.

Figure 4:
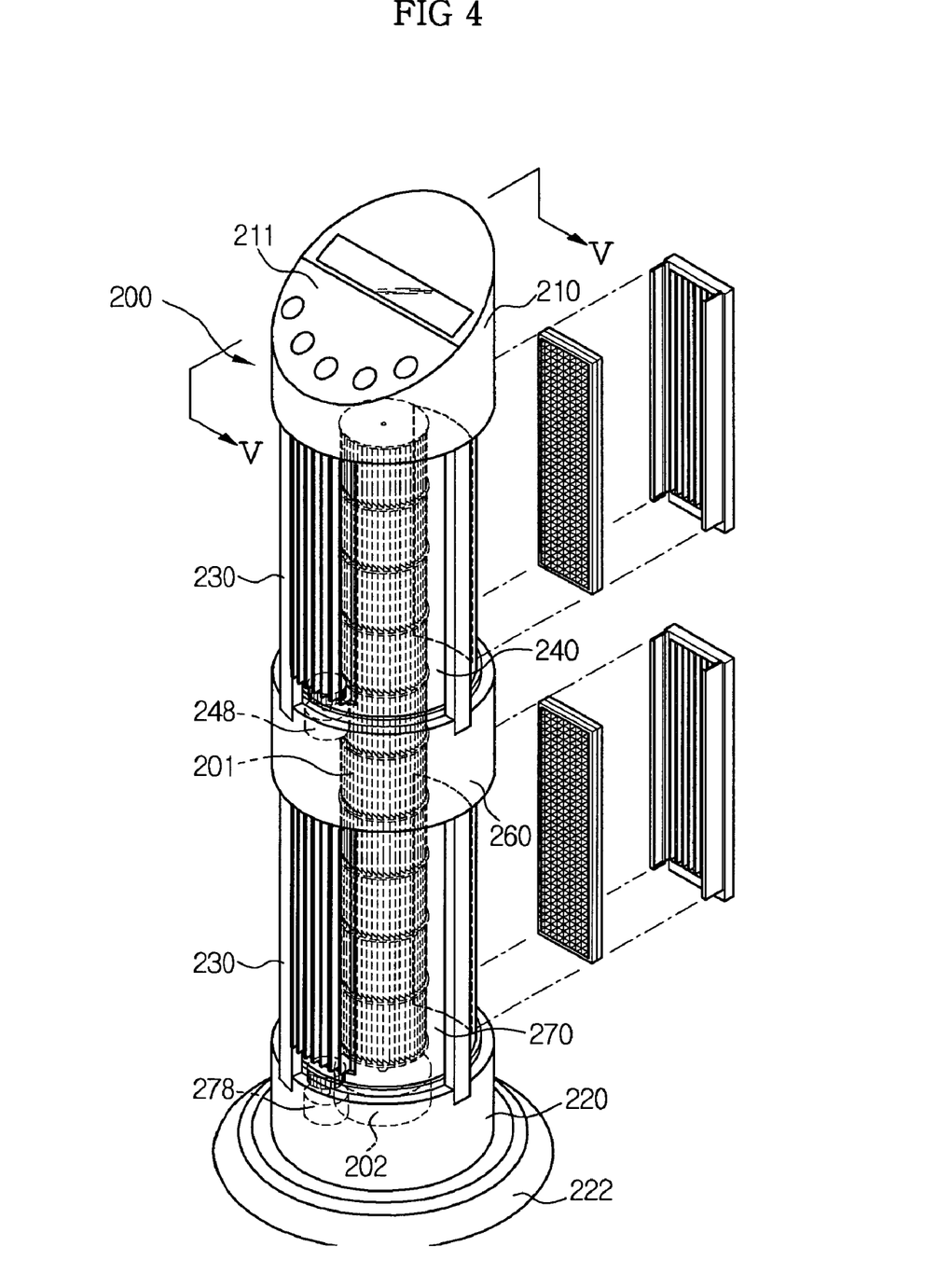
FIG. 4 is a perspective view illustrating an air purifier according to a second embodiment of the present invention.
Figure 5:
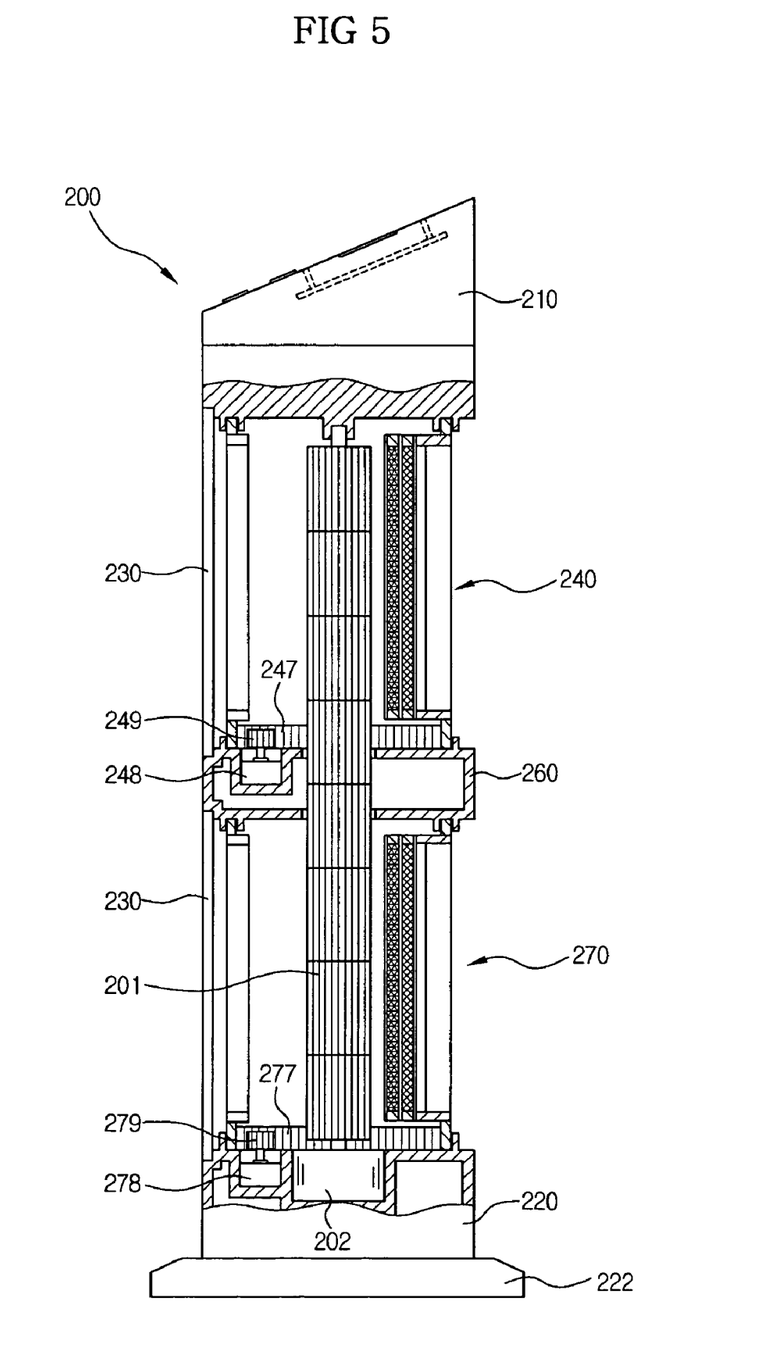
FIG. 5 is a cross-sectional view taken along line V-V of FIG. 4.

An air purifier according to a second embodiment of the present invention will be described in detail with reference to FIGS. 4 and 5 below.

The air purifier according to the second embodiment has the same configuration as that of the air purifier according to the first embodiment, except that the air purifier according to the second embodiment has a rotating body divided into two parts on upper and lower stages in order to more variously change the discharge direction of purified air.

The air purifier according to the second embodiment includes a cylindrical body 200 standing upright, as in the case of the air purifier according to the first embodiment, and a first and second rotating bodies 240 and 270, respectively, mounted on the upper and lower stages in the body 200.

The body 200 comprises an upper body 210 provided with an operation part 211 for controlling the air purifier, a lower body 220 provided with a fulcrum 222, an intermediate body 260 between the first and second rotating bodies 240 and 270, and a support 230 for connecting them.

An axial flow fan 201, which generates a flow force for intaking and discharging air, is provided between the upper and lower bodies 210 and 220 via the intermediate body 260. The lower body 220 is provided with a fan motor 202 for driving the axial flow fan 201.

Like the rotating body of the air purifier according to the first embodiment, the first and second rotating bodies 240 and 270 are defined with intake and discharge flow paths, respectively, and provided with filter assemblies, respectively, for removing foreign substances from the air.

The intermediate body 260 is provided with a first driving motor 248 for rotating the first rotating body 240, and the lower body 220 is provided with a second driving motor 278 for rotating the second rotating body 270, such that the first and second rotating bodies 240 and 270, respectively, can vary intake and discharge directions of air relative to each other. The driving motors 248 and 278 have driving shafts formed with pinions 249 and 279 (shown in FIG. 2), respectively. The first and second rotating bodies 240 and 270 respectively have internal gears 247 and 277 respectively engaging with the pinions 249 and 279 at inner periphery surfaces of the lower ends of the rotating bodies 240 and 270, respectively, thereby transferring a driving force through a gear transmission.

Operation of the air purifier according to the second embodiment is similar to that of the first embodiment. However, since the air purifier according to the second embodiment has the first and second rotating bodies 240 and 270 separated at the upper and lower stages, the rotational directions of the first and second rotating bodies 240 and 270 can be independently controlled, so that the purified air can be more uniformly distributed to respective positions of an installation area.

An air purifier according to a third embodiment of the present invention will be described in detail with reference to FIGS. 6 and 7 as follows.

The air purifier according to the third embodiment is a modification of that of the second embodiment. The air purifier according to the third embodiment is the same as that of the air purifier according to the second embodiment in that first and second rotating bodies 340 and 370 are provided at upper and lower stages of the air purifier. However, there is a difference between the first and second embodiments in that the first rotating body 340 can rotate in relation to the second rotating body 370 below the first rotating body 340.

Figure 6:
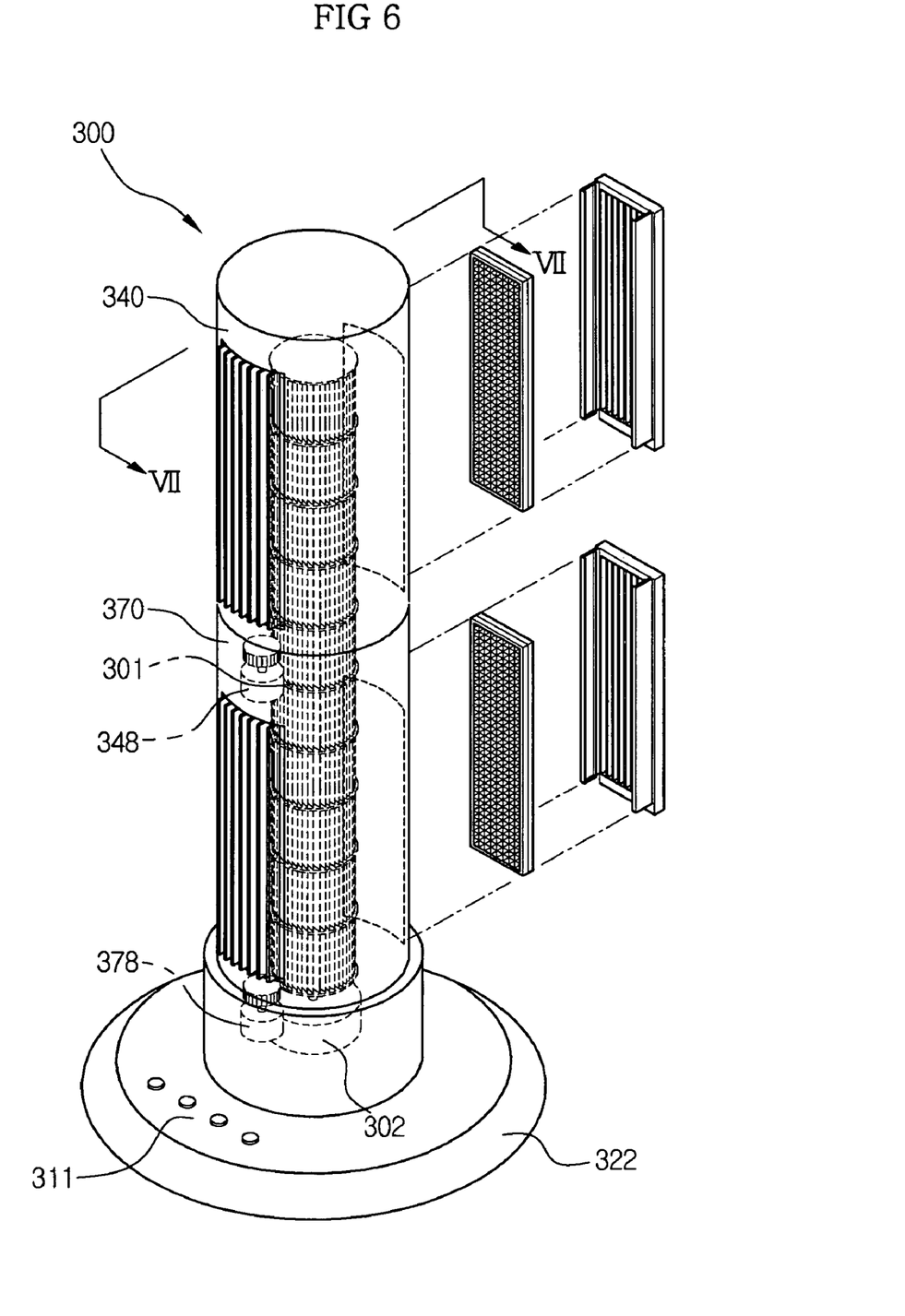
FIG. 6 is a perspective view illustrating an air purifier according to a third embodiment of the present invention.
Figure 7:
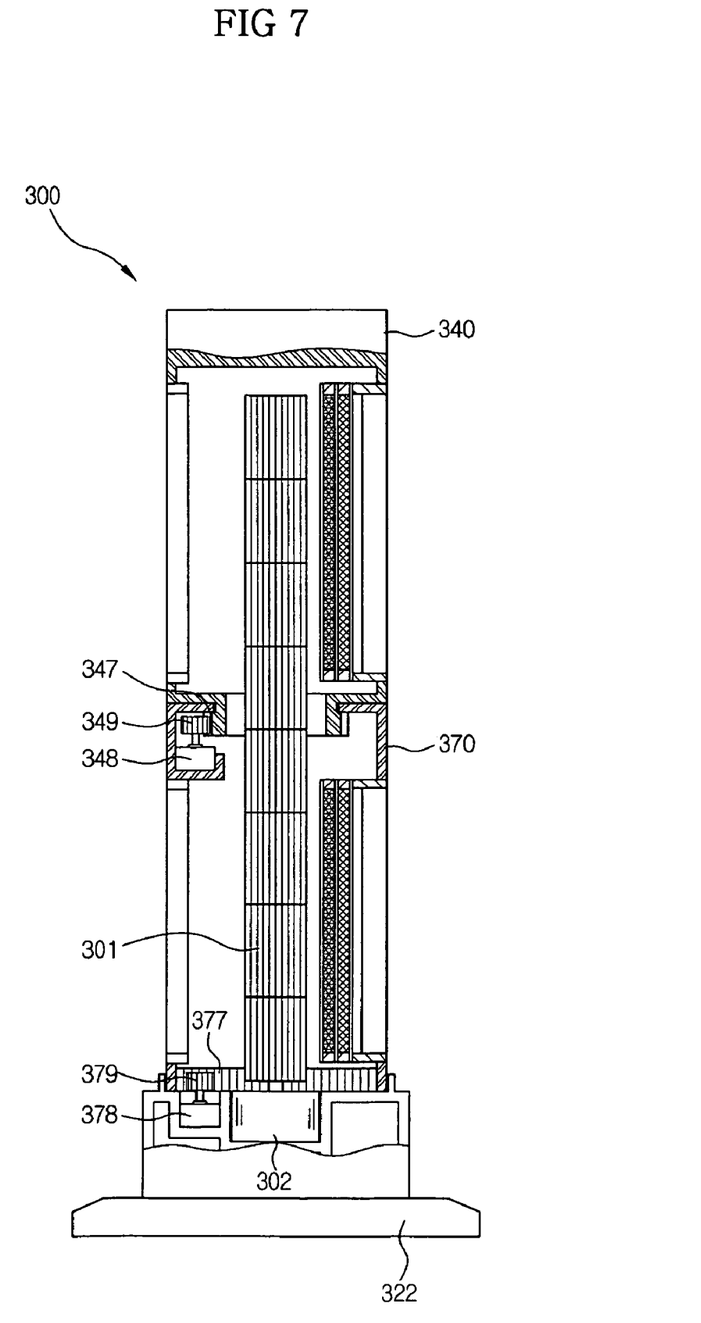
FIG. 7 is a cross-sectional view taken along line VII-VII of FIG. 6.

As shown in FIGS. 6 and 7, the air purifier according to the third embodiment includes a body 300 having an operation part 311 for controlling the air purifier and a fulcrum 322, and the first and second rotating bodies 340 and 370 mounted at the upper and lower stages in the body 300.

An axial flow fan 301, which generates a flow force for intaking and discharging air, is provided at the center between the first and second rotating bodies 340 and 370, and fixed at the lower end of the axial flow fan 301 to a driving shaft of a fan motor 302 for driving the axial flow fan 301.

Like the rotating bodies of the first and second embodiments, the first and second rotating bodies 340 and 370 are defined with intake flow paths and discharge flow paths, respectively, and provided with filter assemblies, respectively, for removing foreign substances in the air.

The body 300 is provided, at one side thereof, with a second driving motor 378 for driving the second rotating body 370, such that the second rotating body 370 can vary intake and discharge directions of air. The second driving motor 378 has a driving shaft formed with a pinion 379, and has an internal gear 377 engaging with the pinion 379 at an inner periphery surface of the lower end of the second rotating body 370, thereby transferring a driving force through a gear transmission.

Unlike the air purifier according to the second embodiment, the first rotating body 340 is connectedly mounted on the second rotating body 370. The second rotating body 370 is provided, at an upper portion in the second rotating body 370, with a first driving motor 348 for driving the first rotating body 340, and the first rotating body 340 is formed, at a lower portion thereof, with a coupling portion 347, which is formed with an outer gear around an outer peripheral surface of the first rotating body 340 and extends through the upper end of the second rotating body 370, such that the first rotating body 340 can rotate in relation to the second rotating body 370. The first driving motor 348 has a driving shaft formed with a pinion 349, thereby driving the first rotating body 340 through engagement of the pinion 349 with the outer gear of the coupling portion 347.

Operation of the air purifier according to the third embodiment is similar to that of the second embodiment. However, the air purifier according to the second third embodiment has the first rotating body 340, which can be driven in relation to the second rotating body 370, so that the first rotating body 340 can be rotated by only driving the second driving motor 378 without driving the first driving motor 348.

As is apparent from the above description, since the air purifier according to the described embodiments of the present invention is structured such that the rotating body defining the flow path around the blowing fan can be freely rotated, there is an advantageous effect in that the discharge direction of air can be freely varied, thereby uniformly distributing the purified air to an installation area.

Further, the intake and discharge directions of air for purifying the installation area can be varied, there is an advantageous effect in that time for purifying the installation area can be reduced, thereby enhancing purification efficiency.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An air purifier comprising:
   a filter which removes contaminants from air passing therethrough;
   a fan which generates a flow force to pass air through the filter; and a rotating body rotatably mounted in the air purifier and defining a flow path around the fan, a discharge direction of the flow path being varied by rotation of the rotating body.

2. The air purifier according to claim 1, further comprising a driving motor which rotates the rotating body.

3. The air purifier according to claim 2, wherein the rotating body includes a rear guide and a stabilizer, and wherein the flow path includes an intake flow path through the filter, and a discharge flow path defined by the rear guide and the stabilizer.

4. The air purifier according to claim 2, further comprising a gear assembly which transfers a driving force from the driving motor to the rotating body.

5. The air purifier according to claim 1, wherein the rotating body includes multiple rotating bodies each having a discharge direction.

6. The air purifier according to claim 5, wherein the multiple rotating bodies include first and second rotating bodies respectively disposed at upper and lower stages in the air purifier.

7. The air purifier according to claim 6, wherein each of the first and second rotating bodies are independently rotatable.

8. The air purifier according to claim 7, further comprising first and second driving motors in the body of the air purifier and which respectively rotate the first and second rotating bodies.

9. The air purifier according to claim 6, wherein the first rotating body rotates in relation to the second rotating body.

10. The air purifier according to claim 9, further comprising a driving motor which rotates the second rotating body, wherein the first rotating body is directly mounted to the second rotating body and is rotated by the driving motor.

11. The air purifier according to claim 1, wherein the rotating body has a longitudinal axis and the the fan is an axial flow fan disposed parallel to the axis.

12. The air purifier according to claim 1, wherein the fan is connected to a fan motor which rotates the fan.

13. An air purifier comprising:
a rotating body defining an airflow path having an air intake section and an air exhaust section, the rotating body having a discharge direction extending from the air exhaust section;
a filter assembly which removes contaminants in air passing therethrough and is disposed at the air intake section;
a fan which generates an air flow to draw air into the airflow path through the intake section and around the fan,
wherein the discharge direction is variable by rotation of the rotating body.

14. The air purifier according to claim 13, wherein the filter assembly includes a filter and a filter case which retains the filter.

15. The air purifier according to claim 14, wherein an edge of the filter is fixed to the filter case.

16. The air purifier according to claim 14, wherein the filter case is detachably coupled to the intake section.

17. The air purifier according to claim 13, further comprising upper and lower bodies having guide rails to guide the rotating body.

18. An air purifier comprising:
a body having a first and a second rotating bodies each having an airflow path between an air intake section and an air exhaust section thereof, each rotating body having a discharge direction extending from the air exhaust section and each rotating body being independently rotatable with respect to the other rotating body;
a filter assembly which removes contaminants in air passing therethrough and is disposed at the air intake section of each rotating body; and
a fan which generates an air flow to draw air into the airflow path through the intake sections and around the fan,
wherein the discharge direction of each rotating body is variable by rotation of the rotating body.

19. An air purifier comprising:
a body having a first and a second rotating bodies each having an airflow path between an air intake section and an air exhaust section, each rotating body having a discharge direction extending from the air exhaust section thereof, the first rotating body being rotatable in relation to the second rotating body;
a filter assembly which removes contaminants in air passing therethrough and is disposed at the air intake section of each rotating body; and
a fan which generates an air flow to draw air into the airflow path through the intake sections and around the fan,
wherein the discharge direction of each rotating body is variable by rotation of the rotating body.

20. A method of purifying air, comprising:
providing a rotating body which defines a flow path to intake air in an intake direction and to discharge air in a discharge direction;
generating an air flow to intake air into the flow path and to discharge air from the flow path; and
varying at least one of an intake direction and a discharge direction by rotating the rotating body.

* * * * *

UNITED STATES PATENT AND TRADEMARK OFFICE
CERTIFICATE OF CORRECTION

PATENT NO. : 7,241,326 B2 Page 1 of 1
APPLICATION NO. : 11/050805
DATED : July 10, 2007
INVENTOR(S) : Jae Oh Han et al.

It is certified that error appears in the above-identified patent and that said Letters Patent is hereby corrected as shown below:

Column 7, Line 36, before "fan" delete "the" (Second Occurrence).

Signed and Sealed this

Fourth Day of December, 2007

JON W. DUDAS
*Director of the United States Patent and Trademark Office*